United States Patent
Ito et al.

(10) Patent No.: US 8,208,862 B2
(45) Date of Patent: Jun. 26, 2012

(54) WIRELESS SYSTEM

(75) Inventors: Akira Ito, Kawasaki (JP); Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 909 days.

(21) Appl. No.: 11/826,609

(22) Filed: Jul. 17, 2007

(65) Prior Publication Data

US 2008/0020711 A1  Jan. 24, 2008

(30) Foreign Application Priority Data

Jul. 21, 2006 (JP) .................................. 2006-199249

(51) Int. Cl.
*H04B 17/00* (2006.01)

(52) U.S. Cl. ....... 455/67.13; 455/69; 455/522; 455/560; 455/127.1; 455/226; 370/310; 370/320; 370/337; 370/332; 370/318

(58) Field of Classification Search .................... 455/69, 455/67.13, 67.11, 63.1, 62, 522, 114.2, 127.1; 370/320, 337, 278, 310, 318, 332
See application file for complete search history.

(56) References Cited

U.S. PATENT DOCUMENTS

| | | | | |
|---|---|---|---|---|
| 4,811,421 | A * | 3/1989 | Havel et al. ..................... | 455/69 |
| 5,199,045 | A * | 3/1993 | Kato ............................. | 375/141 |
| 5,297,161 | A * | 3/1994 | Ling ............................. | 375/130 |
| 5,335,249 | A * | 8/1994 | Krueger et al. ................ | 375/149 |
| 5,559,790 | A * | 9/1996 | Yano et al. .................... | 370/342 |
| 5,724,378 | A | 3/1998 | Miki et al. | |
| 6,993,294 | B2 * | 1/2006 | Nobukiyo et al. .......... | 455/67.11 |
| 7,421,283 | B2 * | 9/2008 | Esmailzadeh et al. ........ | 455/522 |
| 2003/0153277 | A1 | 8/2003 | Ito et al. | |
| 2004/0076172 | A1 * | 4/2004 | Sano ............................. | 370/442 |
| 2006/0126577 | A1 | 6/2006 | Yano et al. | |
| 2006/0153098 | A1 * | 7/2006 | Shimizu et al. ............... | 370/254 |

FOREIGN PATENT DOCUMENTS

| | | |
|---|---|---|
| JP | 09-064846 | 3/1997 |
| JP | 2003-199173 | 7/2003 |
| JP | 2003-244058 | 8/2003 |
| JP | 2003-283462 | 10/2003 |
| JP | 2006-173861 | 6/2006 |

OTHER PUBLICATIONS

Japanese Patent Office "Office Action" issued for corresponding Japanese Patent Application No. 2006-199249, issued Feb. 15, 2011. Partial English translation attached.

* cited by examiner

*Primary Examiner* — Matthew Anderson
*Assistant Examiner* — Ganiyu A Hanidu
(74) *Attorney, Agent, or Firm* — Myers Wolin, LLC (57) ABSTRACT

A wireless system in which a pilot signal is transmitted in such a manner as to restrain error between the SIR of a data channel and that of the pilot signal, thereby improving wireless transmission quality. A specific pilot signal generator generates a specific pilot signal whose power and spreading ratio are identical with those of the data channel. A data channel generator receives propagation environment information and generates the data channel with a transmission format corresponding to the received propagation environment information. A wireless transmitter transmits the specific pilot signal and the data channel. On detecting the specific pilot signal, a propagation environment information notifier measures the SIR of the specific pilot signal, then generates propagation environment information corresponding to the measured SIR, and notifies the wireless transmitting unit of the generated information. A data channel receiver receives the data channel and processes the received data channel.

5 Claims, 10 Drawing Sheets

| CQI value | Transport Block Size | Number of HS-PDSCH | Modulation |
|---|---|---|---|
| 0 | N/A | Out of range | |
| 1 | 137 | 1 | QPSK |
| 2 | 173 | 1 | QPSK |
| 3 | 233 | 1 | QPSK |
| 4 | 317 | 1 | QPSK |
| 5 | 377 | 1 | QPSK |
| 6 | 461 | 1 | QPSK |
| 7 | 650 | 2 | QPSK |
| 8 | 792 | 2 | QPSK |
| 9 | 931 | 2 | QPSK |
| 10 | 1262 | 3 | QPSK |
| 11 | 1483 | 3 | QPSK |
| 12 | 1742 | 3 | QPSK |
| 13 | 2279 | 4 | QPSK |
| 14 | 2583 | 4 | QPSK |
| 15 | 3319 | 5 | QPSK |
| 16 | 3565 | 5 | 16-QAM |
| 17 | 4189 | 5 | 16-QAM |
| 18 | 4664 | 5 | 16-QAM |
| 19 | 5287 | 5 | 16-QAM |
| 20 | 5887 | 5 | 16-QAM |
| 21 | 6554 | 5 | 16-QAM |
| 22 | 7168 | 5 | 16-QAM |
| 23 | 9719 | 7 | 16-QAM |
| 24 | 11418 | 8 | 16-QAM |
| 25 | 14411 | 10 | 16-QAM |
| 26 | 17237 | 12 | 16-QAM |
| 27 | 21754 | 15 | 16-QAM |
| 28 | 23370 | 15 | 16-QAM |
| 29 | 24222 | 15 | 16-QAM |
| 30 | 25558 | 15 | 16-QAM |

"RELATED ART"

FIG. 8

"RELATED ART"

FIG. 9

"RELATED ART"

FIG. 10

WIRELESS SYSTEM

CROSS-REFERENCE TO RELATED APPLICATIONS

This application is based upon and claims the benefits of priority from the prior Japanese Patent Application No. 2006-199249, filed on Jul. 21, 2006, the entire contents of which are incorporated herein by reference.

BACKGROUND OF THE INVENTION

1. Field of the Invention

The present invention relates to wireless systems, and more particularly, to a wireless system for performing wireless communication according to W-CDMA (Wideband-Code Division Multiple Access).

2. Description of the Related Art

In recent years, a wireless communication scheme called HSDPA (High Speed Downlink Packet Access), which is based on W-CDMA technology, has been developed. With HSDPA, a wireless system is realized which employs adaptive modulation so that the modulation scheme may be switched from one to another at a base station in accordance with the radio wave receiving environment of a mobile terminal.

In HSDPA, higher-speed modulation schemes are used for mobile terminals in better receiving conditions, among those situated in an identical cell, thereby achieving high-speed downlink packet transmission. In addition to the switching of modulation schemes, a process is also performed such that packets are transmitted preferentially to those mobile terminals which are in good receiving conditions.

In order for a base station to recognize the receiving environments of mobile terminals, the procedure described below is followed. First, the base station sends out a pilot signal (common pilot signal) with a known carrier frequency, which is received by mobile terminals. On receiving the pilot signal, each mobile terminal measures the propagation environment (amount of interference) as the present receiving environment and notifies the base station of the propagation environment.

Based on the received information on the propagation environments, the base station selects mobile terminals which are in good receiving conditions in terms of interference amount, and then transmits a data channel with a transmission format using high-speed modulation or preferentially transmits a data channel to the selected mobile terminals.

Figure 8:
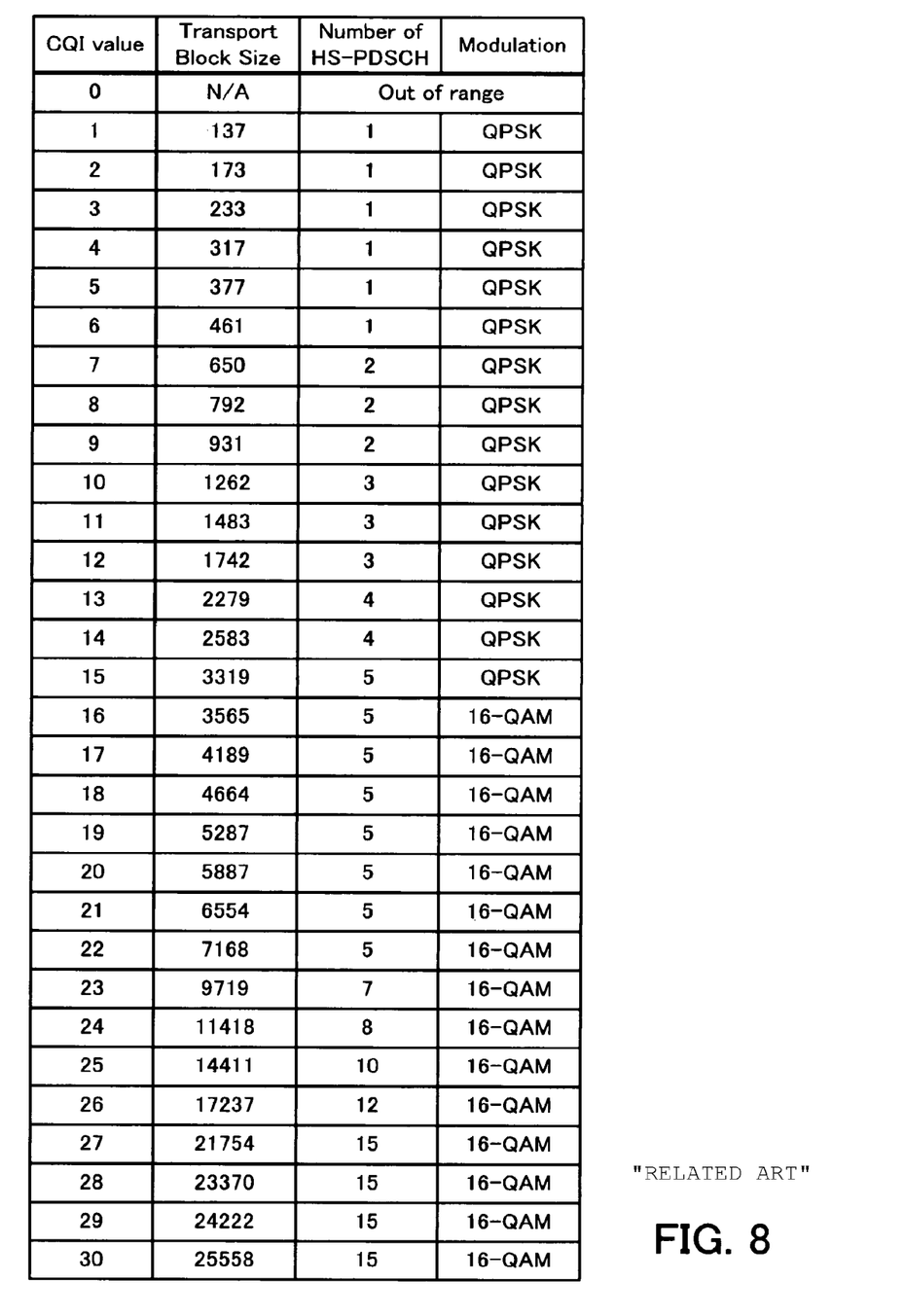
FIG. 8 shows the correspondence between CQI values and modulation schemes.

More specifically, the propagation environment information is represented by a CQI (Channel Quality Indicator) obtained by converting the SIR (Signal-to-Interference Ratio (S/I)) of the pilot signal to a corresponding one of 30 different values, namely, "1" through "30". For example, the CQI "1" is the smallest value of SIR and indicates that the reception quality of the receiving side is of the lowest level. The CQI "30" is the greatest value of SIR and indicates that the reception quality of the receiving side is of the highest level. FIG. 8 shows the correspondence between the CQI values and their applicable modulation schemes, or in other words, the correspondence between the CQI values and their applicable transmission formats (block sizes, modulation schemes).

On the other hand, the pilot signal is not separately transmitted to individual users; it is allocated to a certain code to be used in common among users. This makes it possible to effectively use the frequency band. Also, in order for the pilot signal to be used by all mobile terminals, the transmit power and spreading ratio of the pilot signal are set to large values.

As conventional techniques, there has been proposed a technique in which a mobile station measures the reception quality of a pilot signal, and during the setting of an uplink quality control channel via which quality information is transmitted to the base station, the mobile station starts to transmit the quality information to the base station at predetermined intervals (e.g., Unexamined Japanese Patent Publication No. 2003-199173 (paragraph nos. [0027] to [0031], FIG. 1)).

In cases where the interference amount is measured using the pilot signal at a mobile terminal located in a very good receiving environment, however, variation of the constellation points caused by phase noise or fading is so observable that the CQI fails to be correctly determined, because the transmit power and spreading ratio of the pilot signal are large.

Figure 9:
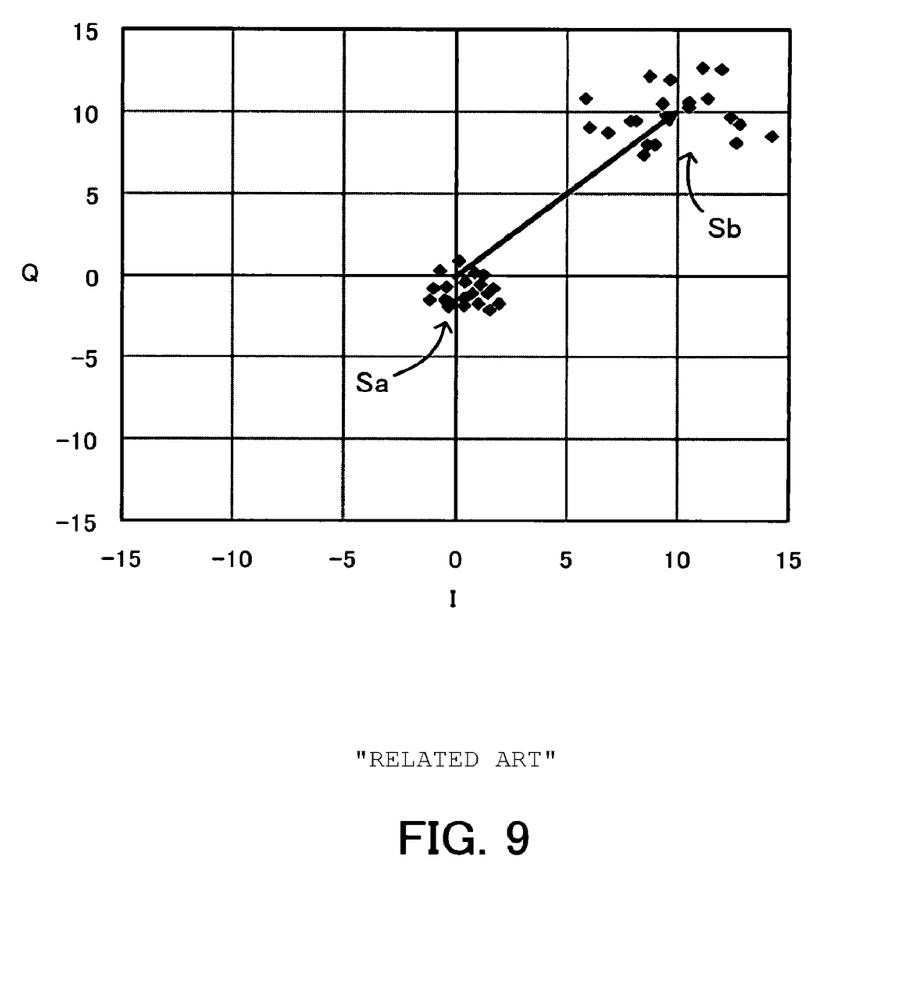
FIG. 9 shows SIR simulation results.

FIG. 9 exemplifies SIR simulation results, wherein sampled symbols of a measurement signal are plotted on the constellation diagram and the tail of the thick arrow indicates the position where the symbol of the original measurement signal is located.

When the measurement signal is propagated with low transmit power and a small spreading ratio (like the data channel) in the simulation environment, the influence of phase noise and fading is small, and therefore, deterioration in the reception quality caused by such factors is also small.

Where such a measurement signal is received and its voltage value is measured, the measured voltage values are plotted as shown in FIG. 9. Specifically, symbols obtained by sampling the measurement signal at different sampling times are concentrated around the symbol of the original measurement signal, as indicated by Sa, because both the amplitude variation (variation in the distance from the origin to the symbol) and phase variation (rotational variation of the symbol with reference to the origin) with respect to the symbol of the original measurement signal are small, showing that no significant error is caused.

On the other hand, when the measurement signal is propagated with high transmit power and a large spreading ratio (like the pilot signal), phase noise and fading greatly affect the measurement signal and thus the reception quality is significantly lowered by these factors.

Where such a measurement signal is received and its voltage value is measured, the measured voltage values are plotted as indicated by Sb. Specifically, symbols obtained by sampling the measurement signal at different sampling times are located farther from the origin and also scattered in phase, as indicated by Sb, because both the amplitude variation and phase variation with respect to the symbol of the original measurement signal are large, proving that significant errors are caused.

Figure 10:
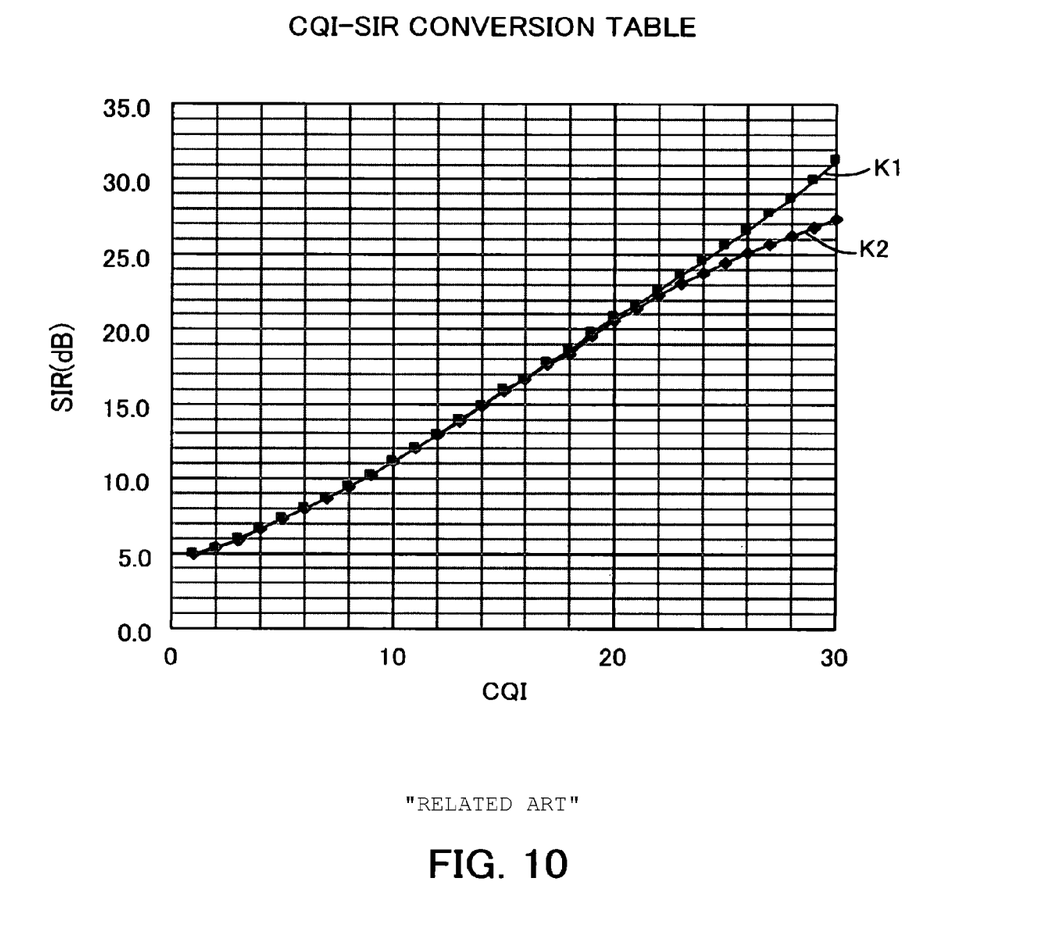
FIG. 10 shows a CQI-SIR conversion table.

FIG. 10 shows a CQI-SIR conversion table, wherein the vertical axis indicates SIR (dB) and the horizontal axis indicates CQI. A curve K1 shows the results of SIR simulation without phase noise, and a curve K2 shows the results of SIR simulation with phase noise.

When there is no phase noise, the SIR shows a nearly linear characteristic, as indicated by the curve K1. On the other hand, when there is phase noise, the SIR shows a different characteristic because error occurs as explained above with reference to FIG. 9. Specifically, the slope of the SIR characteristic begins to decline in the vicinity of the CQI "22", as indicated by the curve K2 in FIG. 10.

Suppose that the SIR of the pilot signal (curve K2) is measured and found to be 26 dB. In this case, the CQI of the pilot signal is "28" but the CQI of the actual data channel (curve K1) corresponding to the SIR of 26 dB is "25", showing that there is a difference between the CQI obtained by measuring the SIR of the pilot signal and that obtained by measuring the SIR of the data channel.

Namely, the CQI should originally indicate the reception state of the data channel. However, since in conventional systems, the CQI is obtained by measuring the SIR of the pilot signal which shows a propagation state different from that of the data channel and which is susceptible to phase noise and fading, a problem arises in that the obtained CQI does not exactly correspond to the actual reception state of the data channel. As a result, the base station fails to select a suitable transmission format for transmitting the data channel, causing throughput degradation.

SUMMARY OF THE INVENTION

The present invention was created in view of the above circumstances, and an object thereof is to provide a wireless system in which a pilot signal is transmitted in such a manner as to restrain error between the SIR of a data channel and that of the pilot signal, thereby improving wireless transmission quality.

To achieve the object, there is provided a wireless system for performing wireless communication. The wireless system comprises a wireless transmitting unit and a wireless receiving unit. The wireless transmitting unit includes a specific pilot signal generator for generating a specific pilot signal whose power and spreading ratio are identical with those of a data channel, a data channel generator for receiving propagation environment information and generating the data channel with a transmission format corresponding to the received propagation environment information, and a wireless transmitter for transmitting the specific pilot signal and the data channel. The wireless receiving unit includes a propagation environment information notifier operative in response to detection of the specific pilot signal to measure a signal-to-interference ratio of the specific pilot signal, then generate propagation environment information corresponding to the measured signal-to-interference ratio, and notify the wireless transmitting unit of the generated propagation environment information, and a data channel receiver for receiving the data channel and processing the received data channel.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
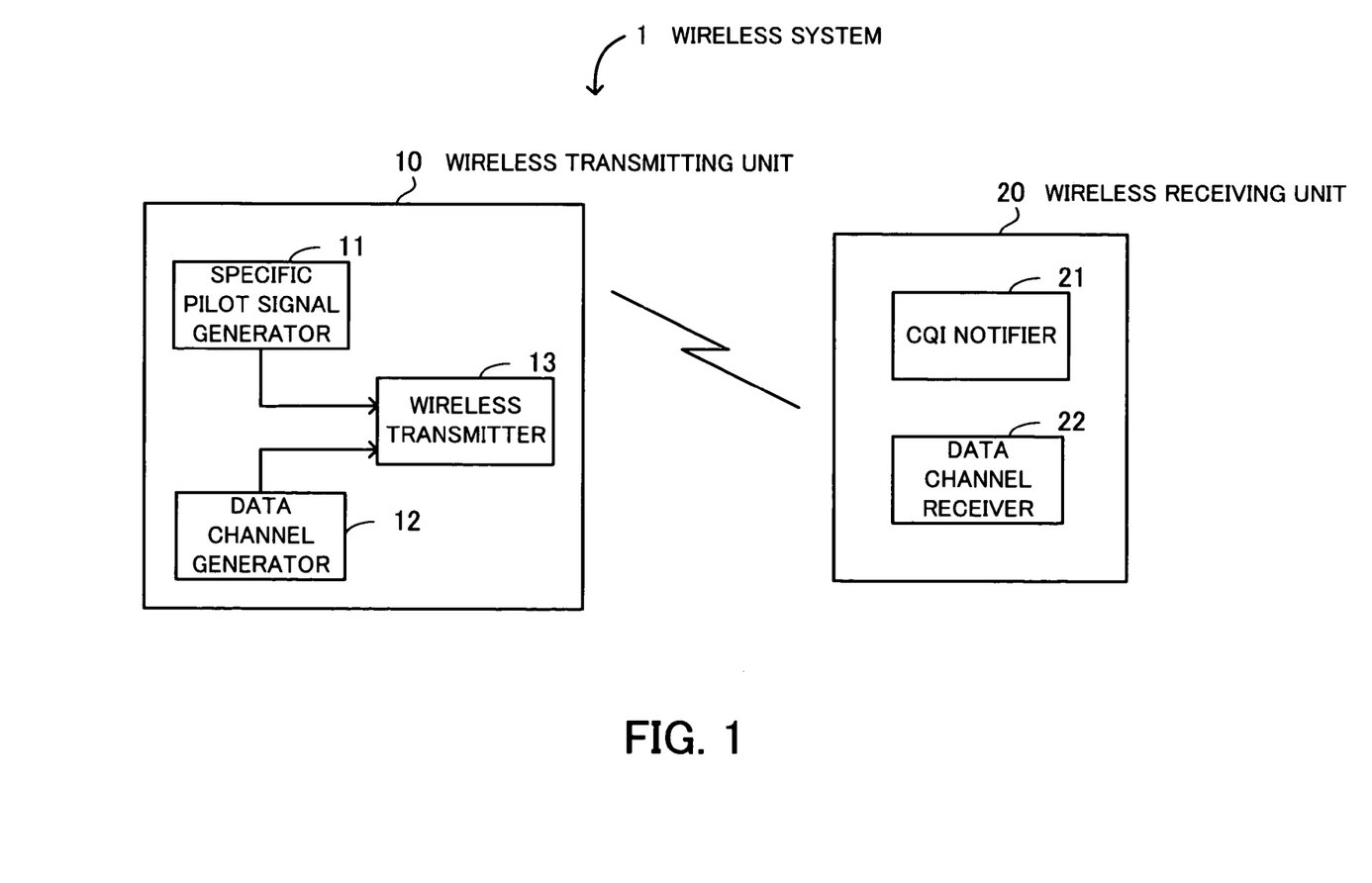
FIG. 1 is a principle diagram of a wireless system.

Preferred embodiments of the present invention will be described below with reference to the accompanying drawings, wherein like reference numerals refer to like elements throughout. FIG. 1 is a principle diagram of a wireless system according to a first embodiment. The wireless system 1 comprises a wireless transmitting unit 10 (corresponding to a base station) and a wireless receiving unit 20 (corresponding to a mobile terminal).

The wireless transmitting unit 10 includes a specific pilot signal generator 11, a data channel generator 12, and a wireless transmitter 13. The specific pilot signal generator 11 generates a specific pilot signal whose power and spreading ratio are identical with those of a data channel. The data channel generator 12 receives propagation environment information (hereinafter CQI) and generates the data channel with a transmission format corresponding to the received CQI. The wireless transmitter 13 transmits the specific pilot signal and the data channel.

The wireless receiving unit 20 includes a CQI notifier 21 and a data channel receiver 22. On detection of the specific pilot signal, the CQI notifier 21 measures the signal-to-interference ratio (hereinafter SIR) of the specific pilot signal, then generates a CQI corresponding to the measured SIR, and notifies the wireless transmitting unit 10 of the generated CQI. The data channel receiver 22 receives the data channel and processes the received data channel.

Figure 2:
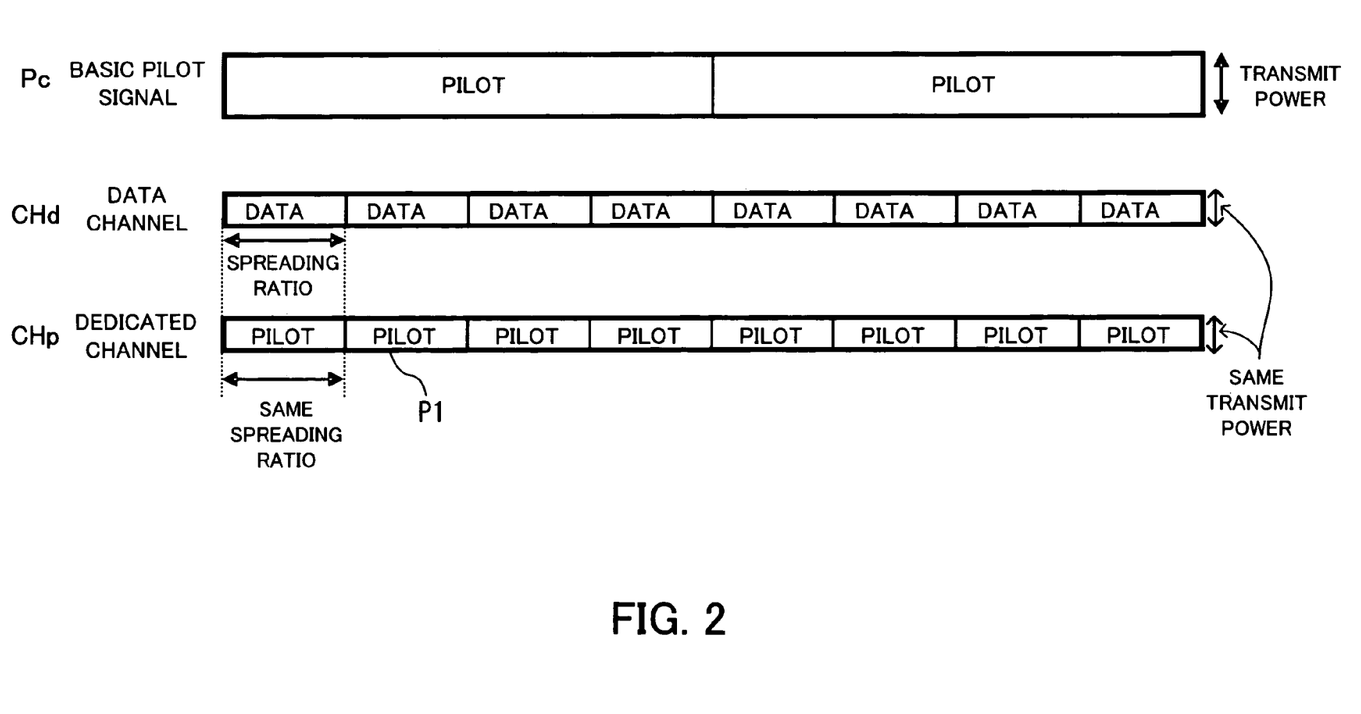
FIG. 2 shows a transmission format for a specific pilot signal.

FIG. 2 shows a transmission format for the specific pilot signal. Specifically, the figure shows the format whereby the data channel CHd and a dedicated channel CHp dedicated to the specific pilot signal P1 are transmitted from the wireless transmitter 13 independently of each other.

The specific pilot signal generator 11 generates a specific pilot signal P1 whose power and spreading ratio are identical with those of the data channel CHd. The wireless transmitter 13 transmits the specific pilot signal P1 (dedicated channel CHp) and the data channel CHd.

In this case, an ordinary pilot signal Pc (hereinafter referred to as basic pilot signal), which has power and spreading ratio greater than those of the data channel CHd, may be sent out at all times from the wireless transmitting unit 10, as in conventional systems. Alternatively, the transmission of the basic pilot signal Pc may be stopped if the specific pilot signal P1 alone is to be used.

On detecting the specific pilot signal P1, the CQI notifier 21 of the wireless receiving unit 20 measures the SIR of the specific pilot signal P1 in the present receiving environment, and notifies the wireless transmitting unit 10 of the CQI corresponding to the measured SIR.

Based on the received CQI, the wireless transmitting unit 10 selects a suitable transmission format (i.e., creates a transmission format for the data channel CHd with the block size and modulation scheme corresponding to the received CQI by using the table shown in FIG. 8), and transmits the data channel CHd with the selected transmission format to the wireless receiving unit 20.

Figure 3:
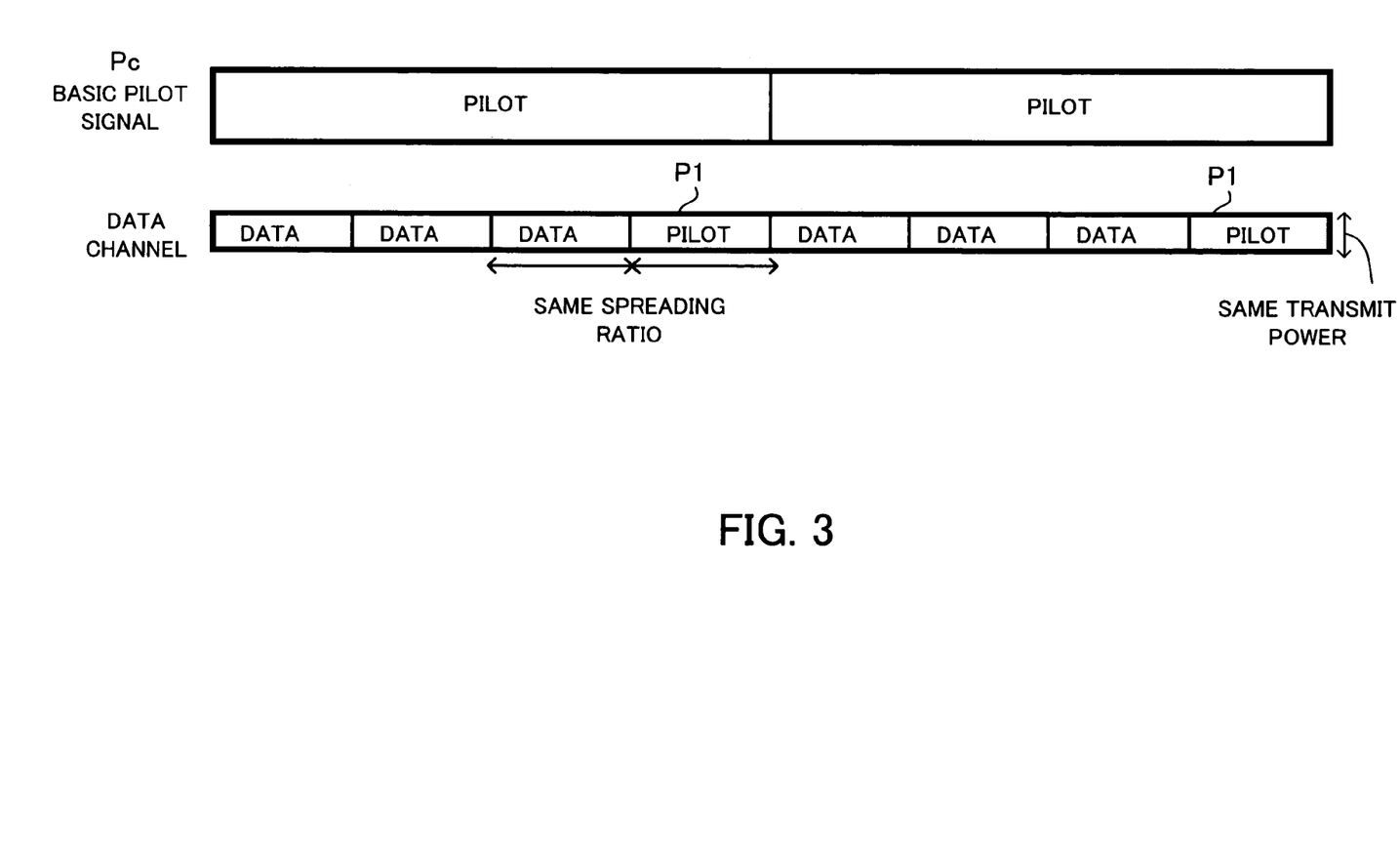
FIG. 3 shows another transmission format for the specific pilot signal.

FIG. 3 shows another transmission format for the specific pilot signal, wherein the data channel is time-divided to be multiplexed with the specific pilot signal P1 so that the specific pilot signal and the data may be transmitted from the wireless transmitter 13 via a single channel.

As described above, the wireless transmitting unit 10 transmits the specific pilot signal P1 whose transmit power and spreading ratio are identical with those of the data channel, and the wireless receiving unit 20 measures the reception state of the specific pilot signal P1 and generates a corresponding CQI. It is therefore possible to obtain a CQI exactly corresponding to the actual reception state of the data channel. Also, since the CQI accurately representing the reception state of the data channel can be acquired, the wireless transmitting unit 10 can select a suitable transmission format for transmitting the data channel, thereby restraining throughput degradation which occurs in conventional systems due to error in the CQI.

Figure 4:
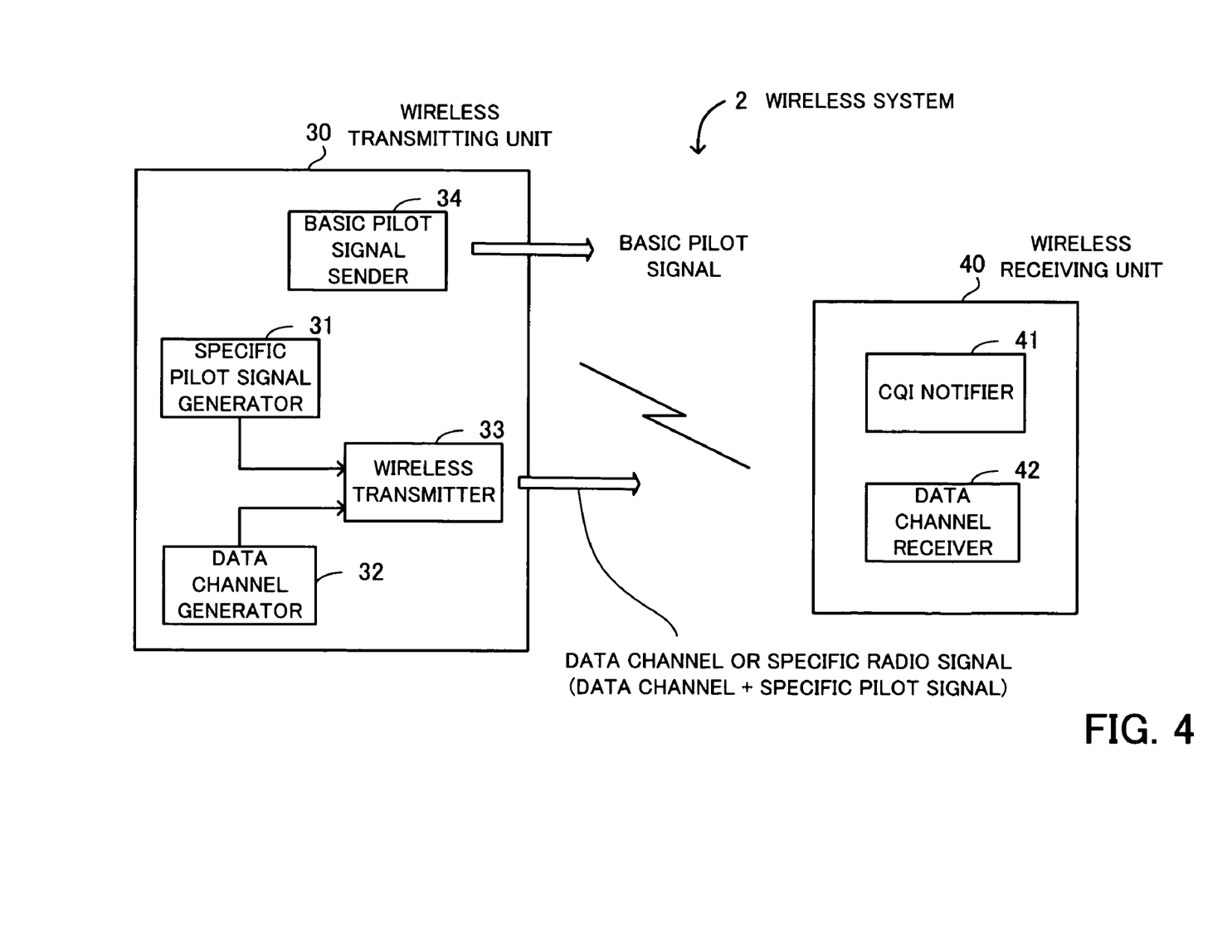
FIG. 4 shows the configuration of a wireless system according to a second embodiment.

A wireless system according to a second embodiment will be now described. FIG. 4 shows the configuration of the wireless system of the second embodiment. The wireless system 2 comprises a wireless transmitting unit 30 and a wireless receiving unit 40.

The wireless transmitting unit 30 includes a specific pilot signal generator 31, a data channel generator 32, a wireless transmitter 33, and a basic pilot signal sender 34. The basic pilot signal sender 34 sends out a basic pilot signal whose power and spreading ratio are greater than those of the data channel.

The specific pilot signal generator 31 generates a specific pilot signal whose power and spreading ratio are identical with those of the data channel. The data channel generator 32 receives a CQI and generates the data channel with a transmission format matching the received CQI. The wireless transmitter 33 determines, based on the value of the received CQI, the reception quality level of the wireless receiving unit 40. Then, the wireless transmitter 33 transmits the data channel if the reception quality level is judged to be of an ordinary level, and transmits a specific radio signal including the specific pilot signal and the data channel if the reception quality level is judged to be of a high level.

The wireless receiving unit 40 includes a CQI notifier 41 and a data channel receiver 42. If the specific pilot signal is not detected, the CQI notifier 41 measures the SIR of the basic pilot signal; if the specific pilot signal is detected, the CQI notifier 41 measures the SIR of the specific pilot signal. Then, the CQI notifier 41 notifies the wireless transmitting unit 30 of the CQI corresponding to the measured SIR. The data channel receiver 42 receives the data channel and processes the received data channel.

The term "error occurrence range" is used herein to denote a divergence range in which a basic pilot signal function curve (curve K2), which is a function of the SIR (basic SIR) of the basic pilot signal and the CQI (basic CQI) corresponding thereto, diverges from a data channel function curve (curve K1), which is a function of the SIR (data SIR) of the data channel and the CQI (data CQI) corresponding thereto.

Specifically, in the CQI-SIR conversion table shown in FIG. 10, the CQI value "22" is a boundary point where the curve K2 (basic pilot signal) begins to diverge from the curve K1 (data channel), and the CQI range from "23" to "30" (SIR range from about 23 dB to 32 dB) is a range (error occurrence range) in which error occurs between the CQI based on the SIR of the basic pilot signal and the CQI based on the SIR of the data channel.

The wireless transmitter 33 determines whether or not the received CQI falls within the error occurrence range. If the CQI is outside the error occurrence range, it is judged that the reception quality level of the wireless receiving unit 40 is of an ordinary level, and the wireless transmitter 33 transmits the data channel. If the received CQI is within the error occurrence range, it is judged that the reception quality level of the wireless receiving unit 40 is of a high level, and the wireless transmitter 33 transmits the specific radio signal.

Figure 5:
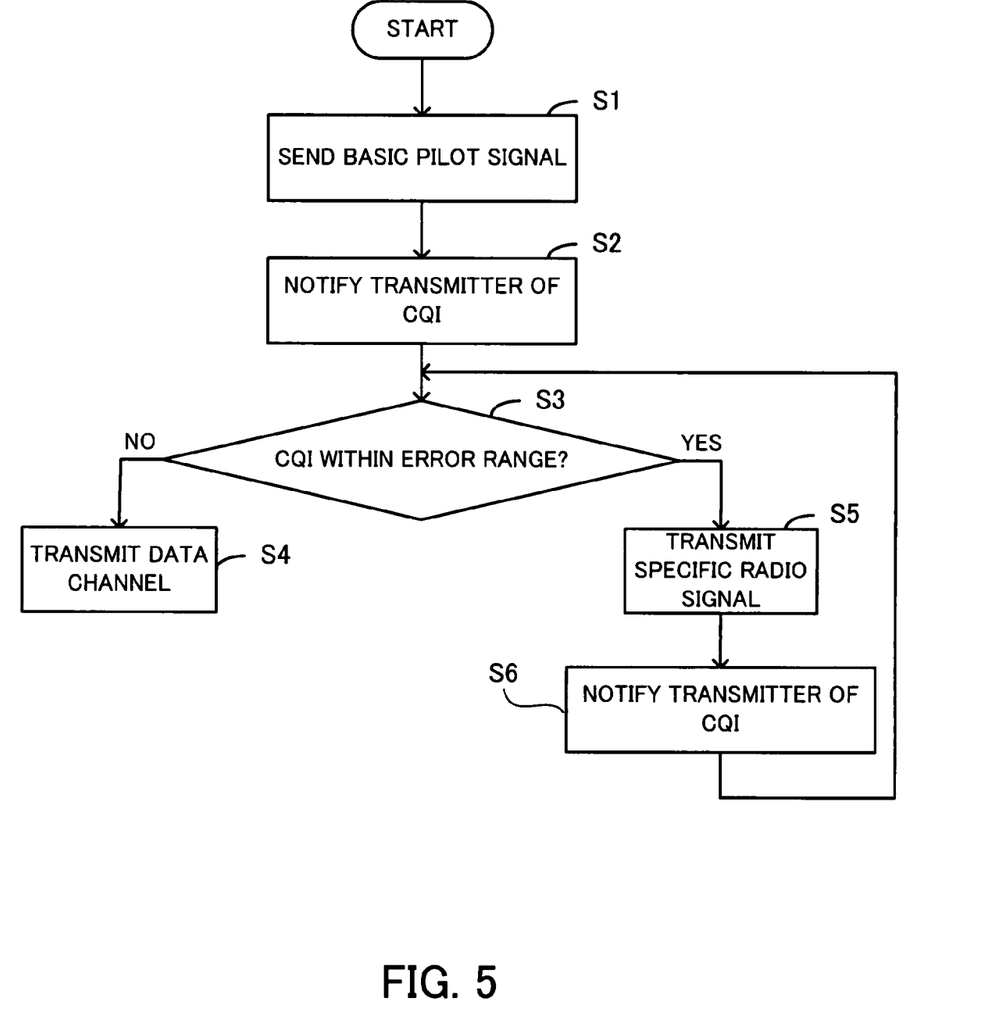
FIG. 5 is a flowchart illustrating the operation of the wireless system.

FIG. 5 is a flowchart illustrating the operation of the wireless system 2.

S1: The basic pilot signal sender 34 constantly sends out the basic pilot signal whose power and spreading ratio are greater than those of the data channel.

S2: If the specific pilot signal is not detected and the basic pilot signal alone is detected, the CQI notifier 41 measures the SIR of the basic pilot signal, then determines an applicable CQI based on the measurement result, and notifies the wireless transmitting unit 30 of the determined CQI.

S3: The wireless transmitter 33 determines whether or not the received CQI falls within the error occurrence range. If the CQI is outside the error occurrence range, the flow proceeds to Step S4; if the CQI is within the error occurrence range, the flow proceeds to Step S5.

S4: The wireless transmitter 33 transmits the data channel.

S5: The wireless transmitter 33 transmits the specific radio signal including the data channel and the specific pilot signal.

S6: On detecting the specific pilot signal, the CQI notifier 41 of the wireless receiving unit 40 measures the SIR of the specific pilot signal, then determines an applicable CQI based on the measurement result, and notifies the wireless transmitting unit 30 of the determined CQI, whereupon the flow returns to Step S3.

When the received CQI is outside the error occurrence range, the wireless transmitting unit 30 regards the received CQI as involving no error, because the CQI-SIR function curve of the pilot signal coincides with that of the data channel, and accordingly, the wireless transmitter 33 transmits only the data channel (the specific pilot signal is not transmitted and the wireless receiving unit 40 determines the CQI based on the basic pilot signal).

On the other hand, when the received CQI is within the error occurrence range, the CQI is regarded as involving error, because the CQI-SIR function curves of the pilot signal and data channel do not coincide with each other, and therefore, the wireless transmitter 33 transmits the specific radio signal (specific pilot signal+data channel). On detecting the specific pilot signal, the wireless receiving unit 40 derives the CQI from the specific pilot signal.

In cases where the wireless transmitting unit 30 is transmitting the specific radio signal and the CQI value determined by the wireless receiving unit 40 on the basis of the specific pilot signal falls within the range from "23" to "30", the determined CQI involves no error because it is derived based on the CQI-SIR function curve (curve K1) of the data channel (the CQI involves no error because it is obtained from the specific pilot signal whose power and spreading ratio are equal to those of the data channel). Thus, the wireless transmitting unit 30 regards the reception quality level of the receiving unit as high and continues to transmit the specific radio signal.

On the other hand, in cases where during the transmission of the specific radio signal (or the basic pilot signal), the received CQI falls within the range from "1" to "22" in which the CQI-SIR function curves of the pilot signal and data channel coincide with each other, the reception quality level of the receiving unit is regarded as ordinary. In such cases, since it is unnecessary for the wireless transmitting unit 30 to transmit the specific pilot signal, the wireless transmitter 33 transmits only the data channel (the basic pilot signal is sent out at all times and the wireless receiving unit 40 determines the CQI based on the basic pilot signal).

Thus, in the second embodiment, the specific pilot signal is transmitted or stopped depending on the reception quality of the wireless receiving unit 40, and in cases where high reception quality is not required, the specific pilot signal is not transmitted, making it possible to improve the radio wave transmission efficiency. Also, the CQI accurately representing the actual reception state of the data channel can be acquired, as in the first embodiment. Consequently, the wireless transmitting unit 30 can select a suitable transmission format for transmitting the data channel, thereby restraining throughput degradation which occurs in conventional systems due to error in the CQI.

Figure 6:
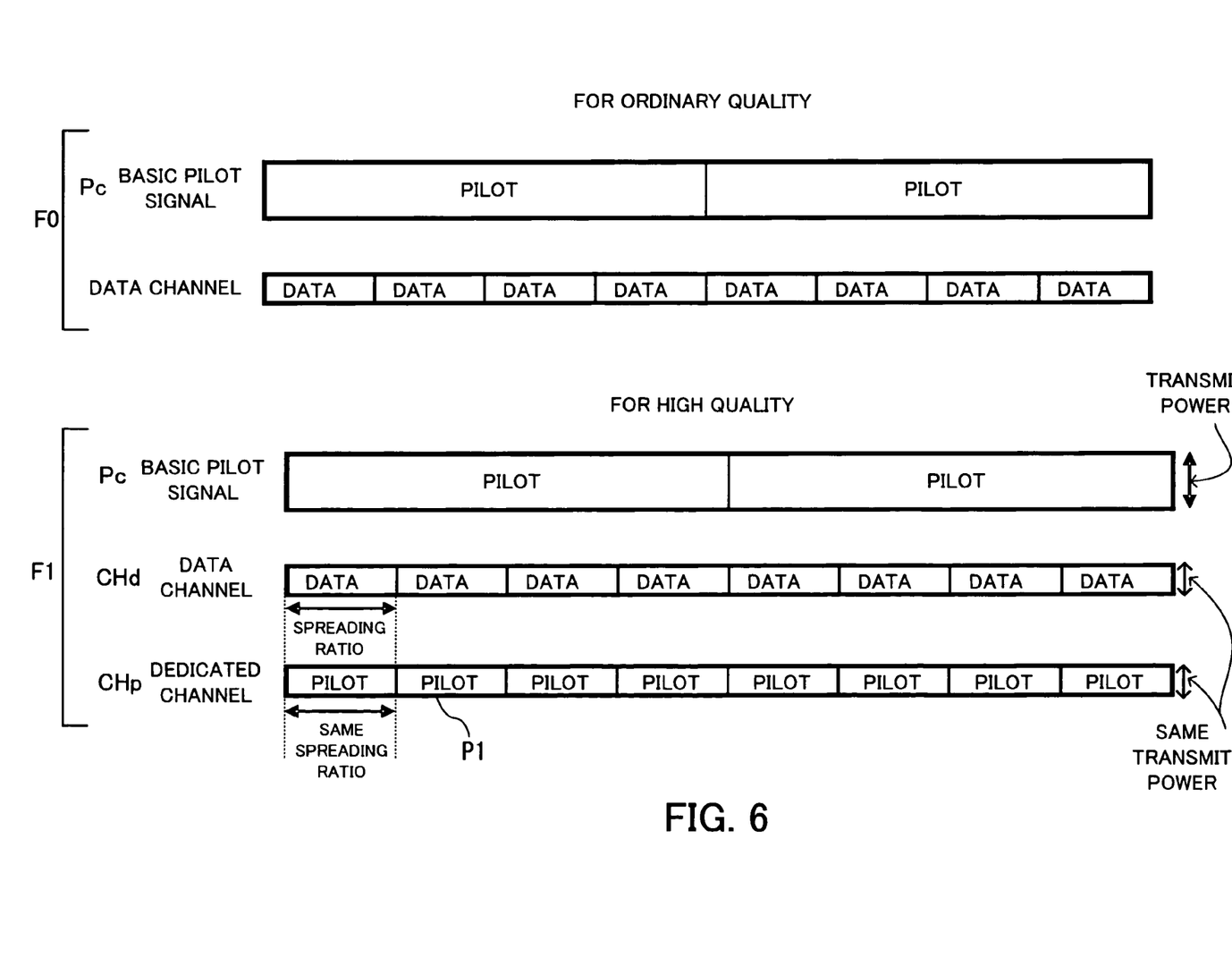
FIG. 6 shows a transmission format for a specific radio signal.

FIG. 6 shows a transmission format for the specific radio signal. When the received CQI is outside the error occurrence range, a format F0 (for ordinary quality) is used as the transmission format, and when the received CQI is within the error occurrence range, a format F1 (for high quality) is used as the transmission format.

The specific radio signal format F1 includes a dedicated channel CHp dedicated to the specific pilot signal P1. The data channel CHd and the dedicated channel CHp are transmitted independently of each other.

Figure 7:
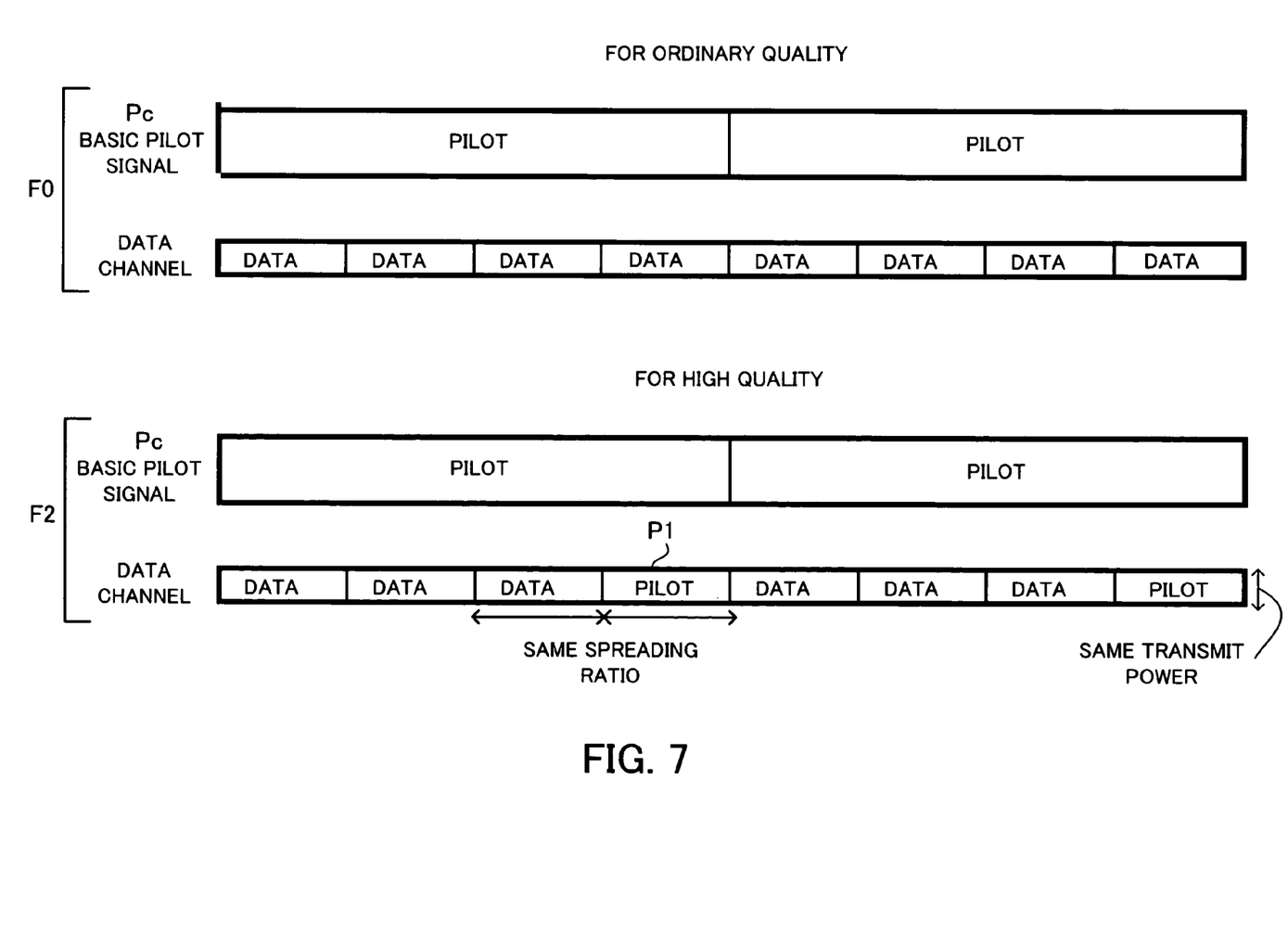
FIG. 7 shows another transmission format for the specific radio signal.

FIG. 7 shows another transmission format for the specific radio signal. When the received CQI is outside the error occurrence range, the format F0 (for ordinary quality) is used as the transmission format, and when the received CQI is within the error occurrence range, a format F2 (for high quality) is used as the transmission format.

In the specific radio signal format F2, the data channel is time-divided to be multiplexed with the specific pilot signal P1 so that the specific pilot signal and data of the data channel may be transmitted via a single channel.

In the wireless system of the present invention, the wireless transmitting unit generates a specific pilot signal whose power and spreading ratio are identical with those of the data channel, and transmits the specific pilot signal together with the data channel. The wireless receiving unit measures the signal-to-interference ratio (SIR) of the specific pilot signal, then generates propagation environment information (CQI) corresponding to the measured signal-to-interference ratio, and notifies the wireless transmitting unit of the generated information. Since the SIR of the specific pilot signal is identical with that of the data channel, there occurs no error between the CQI based on the SIR of the data channel and the CQI based on the SIR of the specific pilot signal, making it possible to determine the CQI with accuracy and thus to improve wireless transmission quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless system for performing wireless communication, the wireless system comprising:
a wireless transmitting unit including a basic pilot signal sender to send out a basic pilot signal whose power and spreading ratio are greater than those of a data channel, a specific pilot signal generator to generate a specific pilot signal whose power and spreading ratio are identical with those of the data channel, a data channel generator to receive propagation environment information and generating the data channel with a transmission format corresponding to the received propagation environment information, and a wireless transmitter to determine a reception quality level of a receiving side based on a value of the received propagation environment information, transmitting the data channel if the reception quality level is judged to be of an ordinary quality level when the value is out of a certain range, and transmitting a specific radio signal including the specific pilot signal and the data channel if the reception quality level is judged to be of a high quality level when the value is within the certain range; and
a wireless receiving unit including a propagation environment information notifier to measure a signal-to-interference ratio of the basic pilot signal if the specific pilot signal is not detected, measuring a signal-to-interference ratio of the specific pilot signal if the specific pilot signal is detected, generating propagation environment information corresponding to a measurement result, and notifying the wireless transmitting unit of the generated propagation environment information, and a data channel receiver to receive the data channel and processing the received data channel.

2. The wireless system according to claim 1, wherein the wireless transmitter determines whether or not the value of the received propagation environment information falls within an error occurrence range in which a basic pilot signal function curve, which is a function of the signal-to-interference ratio of the basic pilot signal and propagation environment information corresponding thereto, diverges from a data channel function curve which is a function of the signal-to-interference ratio of the data channel and propagation environment information corresponding thereto, judges the reception quality level of the wireless receiving unit to be of an ordinary quality level if the value of the received propagation environment information is outside the error occurrence range, and judges the reception quality level of the wireless receiving unit to be of a high quality level if the value of the received propagation environment information is within the error occurrence range.

3. The wireless system according to claim 1, wherein, when the specific radio signal is to be transmitted, the wireless transmitter generates a dedicated channel to the specific pilot signal and transmits the data channel and the dedicated channel independently.

4. The wireless system according to claim 1, wherein, when the specific radio signal is to be transmitted, the wireless transmitter time-divides the data channel to be multiplexed with the specific pilot signal and transmits the specific pilot signal and data of the data channel via a single channel.

5. A method of communicating wireless signals between a wireless transmitting unit and a wireless receiving unit, the method comprising:
(a) the wireless transmitting unit performing:
sending out a basic pilot signal whose power and spreading ratio are greater than those of a data channel;
generating a specific pilot signal whose power and spreading ratio are identical with those of the data channel;
receiving propagation environment information and generating the data channel with a transmission format corresponding to the received propagation environment information;
determining a reception quality level of a receiving side based on a value of the received propagation environment information;
transmitting the data channel if the reception quality level is judged to be of an ordinary quality level when the value is out of a certain range; and
transmitting a specific radio signal including the specific pilot signal and the data channel if the reception quality level is judged to be of a high quality level when the value is within the certain range;

(b) the wireless receiving unit performing:
measuring a signal-to-interference ratio of the basic pilot signal if the specific pilot signal is not detected;
measuring a signal-to-interference ratio of the specific pilot signal if the specific pilot signal is detected;
generating propagation environment information corresponding to a measurement result;
notifying the wireless transmitting unit of the generated propagation environment information; and
receiving the data channel and processing the received data channel.

* * * * *